United States Patent
Peukert

(10) Patent No.: US 9,918,612 B2
(45) Date of Patent: Mar. 20, 2018

(54) DISHWASHER AND METHOD FOR CLEANING ITEMS TO BE WASHED

(71) Applicant: MEIKO Maschinenbau GmbH & Co. KG, Offenburg (DE)

(72) Inventor: Thomas Peukert, Bühl (DE)

(73) Assignee: MEIKO MASCHINENBAU GMBH & CO. KG, Offenburg (DE)

(*) Notice: Subject to any disclaimer, the term of this patent is extended or adjusted under 35 U.S.C. 154(b) by 44 days.

(21) Appl. No.: 15/022,927

(22) PCT Filed: Sep. 29, 2014

(86) PCT No.: PCT/EP2014/070761
§ 371 (c)(1),
(2) Date: Mar. 17, 2016

(87) PCT Pub. No.: WO2015/044409
PCT Pub. Date: Apr. 2, 2015

(65) Prior Publication Data
US 2016/0227980 A1    Aug. 11, 2016

(30) Foreign Application Priority Data
Sep. 30, 2013  (DE) .................. 10 2013 219 700

(51) Int. Cl.
*A47L 15/46*    (2006.01)
*A47L 15/00*    (2006.01)
(Continued)

(52) U.S. Cl.
CPC .......... *A47L 15/46* (2013.01); *A47L 15/0021* (2013.01); *A47L 15/0026* (2013.01);
(Continued)

(58) Field of Classification Search
None
See application file for complete search history.

(56) References Cited

U.S. PATENT DOCUMENTS 7,695,568 B2    4/2010  Gaus
2010/0294321 A1   11/2010  Rosenbauer
(Continued)

FOREIGN PATENT DOCUMENTS

DE    10 2004 056 052 A1    6/2006
DE    10 2006 050 876 A1    4/2008
(Continued)

OTHER PUBLICATIONS

International Search Report issued in related International Patent Application No. PCT/EP2014/070761, dated Nov. 26, 2014.
(Continued)

*Primary Examiner* — Eric W Golightly
(74) *Attorney, Agent, or Firm* — Foley & Lardner LLP

(57) ABSTRACT

The invention proposes a dishwasher, comprising a cleaning chamber for accommodating washware. The dishwasher is designed to apply at least one washing liquid and at least one final-rinse liquid to the washware in the cleaning chamber. The dishwasher has a controller which is designed to carry out at least one cleaning program. The cleaning program comprises at least one washing step, in which the washing liquid is applied to the washware, and at least one final-rinse step, in which the final-rinse liquid is applied to the washware. The dishwasher has at least one operator control element which can be operated by a user. The controller is designed in such a way that the final-rinse step can be carried out at least once on the basis of operation of the operator control element after at least the washing step of the cleaning program has been carried out.

12 Claims, 2 Drawing Sheets

(51) Int. Cl.
  *A47L 15/42* (2006.01)
  *G06F 3/01* (2006.01)
  *G06F 3/14* (2006.01)
  *G06F 3/16* (2006.01)

(52) U.S. Cl.
  CPC ....... *A47L 15/0034* (2013.01); *A47L 15/0076* (2013.01); *A47L 15/0078* (2013.01); *A47L 15/4285* (2013.01); *A47L 15/4293* (2013.01); *G06F 3/016* (2013.01); *G06F 3/14* (2013.01); *G06F 3/16* (2013.01); *A47L 2301/04* (2013.01); *A47L 2301/08* (2013.01); *A47L 2401/04* (2013.01); *A47L 2401/20* (2013.01); *A47L 2401/26* (2013.01); *A47L 2501/26* (2013.01); *A47L 2501/30* (2013.01)

(56) References Cited

U.S. PATENT DOCUMENTS

| | | | |
|---|---|---|---|
| 2011/0132403 | A1 | 6/2011 | Buerkle et al. |
| 2012/0042908 | A1 | 2/2012 | Jerg et al. |
| 2012/0118336 | A1 | 5/2012 | Welch |
| 2014/0041688 | A1 | 2/2014 | Maennle et al. |

FOREIGN PATENT DOCUMENTS

| | | |
|---|---|---|
| DE | 10 2006 039 434 A1 | 5/2008 |
| DE | 10 2008 006 352 A1 | 7/2009 |
| DE | 10 2008 044 952 A1 | 3/2010 |
| DE | 10 2010 039 611 A1 | 2/2012 |
| DE | 10 2011 053 666 A1 | 5/2012 |
| EP | 2 420 175 A2 | 2/2012 |

OTHER PUBLICATIONS

Written Opinion issued in related International Patent Application No. PCT/EP2014/070761, dated Nov. 26, 2014.
International Preliminary Report on Patentability issued in related International Patent Application No. PCT/EP2014/070761, dated Mar. 31, 2016.

DISHWASHER AND METHOD FOR CLEANING ITEMS TO BE WASHED

CROSS-REFERENCE TO RELATED APPLICATIONS

This application is the National Phase of International Patent Application No. PCT/EP2014/070761, filed Sep. 29, 2014, which claims priority from German Patent Application No. 10 2013 219 700.4, filed Sep. 30, 2013. The contents of these applications is incorporated herein by reference in their entirety.

FIELD OF THE INVENTION

The invention relates to a dishwasher and to a method for cleaning washware. Such dishwashers and methods for cleaning washware can be used, in particular, in the area of large-scale commercial kitchens, for example in canteens in schools, universities, businesses, hospitals and care facilities, authorities or similar facilities in which a large number of people have to be served within a short time. However, other facilities are also feasible in principle.

PRIOR ART

The prior art discloses a large number of cleaning apparatuses for cleaning different types of washware. Cleaning apparatuses of this kind are disclosed in DE 10 2004 056 052 A1, DE 10 2006 050 876 A1 or DE 10 2006 039 434 A1 for example.

The present invention relates, in particular, to dishwashers with a stationary washing process, in which dishwashers washware in the form of dishes is cleaned in a cleaning chamber. Dishwashers of this kind with a stationary washing process generally execute an entire process in which one or more cleaning programs can be carried out. In many cases, a cleaning program of this kind is made up of one or more washing steps in which a washing liquid, for example a detergent solution, is applied to the washware, this being followed by draining and at least one final-rinse step, for example a final-rinse step using fresh water. This can optionally be followed by a drying step. The cleaning program can further comprise application of certain chemicals, for example acids, lyes or disinfectants, to the washware.

Different processes are defined as cleaning programs in dishwashers of this kind and are generally stored in a controller of the dishwasher and can be correspondingly selected by the user. A cleaning program of this kind generally describes in each case one process which is made up of individual steps and which is generally performed in full. After the cleaning program has been performed, the washware is then removed from the dishwasher.

The dishwasher can then be loaded with washware once again in order to start a new cleaning program at the request of a user.

However, one disadvantage of known methods and dishwashers with a stationary washing method, in particular in the field of glass-washing technology, is that the cleaning and drying result can be highly dependent on the manner of use of the dishwasher. In particular, a drying result, for example in the case of glasses, can be highly dependent on how long the washware, in particular the glasses, remain in the dishwasher after the cleaning program has been completed. Optimum conditions for drying prevail immediately after the final-rinse operation, for example the fresh-water final-rinse operation, has been completed owing to the effects of the rinse aid, which is generally added to the final-rinse liquid, and/or owing to an appropriate temperature of the washware. A good drying result can be achieved when said washware is promptly removed from the dishwasher since a thin and uniform film of the final-rinse liquid on the washware can run off for the most part and the remainder of the final-rinse liquid can evaporate without problems. A comparable effect can be achieved when drying in the machine is directly activated after the final-rinse step, for example by supplying fresh air. However, in practice, an optimum drying result does not occur very often.

As has been identified within the scope of the present invention, one cause of this in many cases may be that the washware is not removed from the dishwasher at the correct time or has remained in the dishwasher for too long. An empirical variable, which has been identified within the scope of the present invention, for a maximum residence time in the dishwasher is approximately 2 minutes. After this time has elapsed, condensate forms on the washware, for example in the interior of the glasses, on account of condensation from vapors rising from the wash tank if the washware still remains in the dishwasher. However, the condensing vapors do not contain any rinse aid or any wetting agent and therefore generally precipitate on the washware in the form of drops. Wetting of glasses in this way with pure water without detergent can cause corrosion of the glass, particularly if the state lasts for some time. At the same time, the vapors can also contain constituents of the detergent solution and/or other impurities which can at least partially produce evaporation residues on the washware. One consequence can be that the washware, in particular glasses, is no longer optimally dried after removal. Firstly, the drops on the washware can reach a size such that the inherent heat of the washware cannot dry off said drops. Secondly, residues which at least have an adverse visual effect on the cleaning result, but could also raise questions in respect of hygiene, are visible.

In practice, an operator of the dishwasher generally manages by subsequently polishing the washware as soon as it has been removed from the dishwasher. In particularly severe cases, the washing process can also be restarted. However, both solutions require a correspondingly increased level of expenditure, that is to say increased expenditure of time and also increased consumption of resources and energy.

DE 10 2010 039 611 A1 discloses a dishwasher having a control device, wherein an operator control device is provided. Said operator control device can be used to input at least one operator control command to execute one or more adjustment measures to at least one of the washing programs. The background is that, in practice, conflicting demands, such as a high-quality cleaning effect and a high-quality drying effect for example, are made of a dishwasher. In addition, marks on the cleaned washware should be avoided. One or more adjustment measures to one of the washing programs can be input by means of the operator control command, wherein different adjustment measures are described. Carrying out at least one additional intermediate washing cycle or increasing a quantity of a washing liquid which is used in a partial washing cycle, which is provided as the final-rinse cycle, are described amongst other things.

DE 10 2011 053 666 A1 discloses a dishwasher with a filter system which can be used to separate dirt from the recirculated liquid. Furthermore, a heating element for pyrolytically cleaning dirt from the filter system is provided. The use of a final-rinse phase and a subsequent drying phase is described. Said document describes, amongst other things, that the drying conditions for the drying phase can be set by a user at a user interface.

OBJECT OF THE INVENTION

Therefore, one object of the present invention is to provide a dishwasher and a method for cleaning washware, which dishwasher and method at least largely avoid the disadvantages of known dishwashers and cleaning methods. In particular, an improved drying result and improved hygiene of the washware should also be ensured in the case of a relatively long residence time of the washware in a cleaning chamber of the dishwasher.

DISCLOSURE OF THE INVENTION

Said object is achieved by a dishwasher and a method having the features of the independent patent claims. Advantageous developments, which can be realized individually or in any desired combination, are set out in the dependent claims.

In the text which follows, the terms "have", "exhibit", "comprise" and "include" or any desired grammatical variations thereof are used in a non-exclusive manner. Accordingly, said terms can relate both to situations in which, along with features introduced by said terms, no further features are present or to situations in which one or more further features are present. For example, the expression "A has B", "A exhibits B", "A comprises B" or "A includes B" can refer both to situations in which, apart from B, there are no further elements in A (that is to say, to a situation in which A consists exclusively of B) and to situations in which, in addition to B, there are one or more further elements in A, for example element C, elements C and D or even further elements.

Furthermore, the terms "preferably", "in particular", "for example" and similar terms are used in conjunction with optional features in the text which follows, without restricting alternative embodiments as a result. Therefore, features which are introduced by these terms are optional features and said features are not intended to restrict the scope of protection of the claims, and in particular of the independent claims. Therefore, the invention may, as the skilled person will recognize, also be carried out using other refinements. Similarly, features which are introduced by "in an embodiment of the invention" or by "in an exemplary embodiment of the invention" will be understood to mean optional features, without alternative refinements or the scope of protection of the independent claims intending to be restricted by said optional features. Furthermore, all of the possible ways of combining the features introduced by these introductory expressions with other features, be they optional or non-optional features, should remain unaffected by said introductory expressions.

A dishwasher is proposed in a first aspect of the present invention. In this case, a dishwasher is intended to be understood to mean, in general, an apparatus for cleaning washware, wherein one or more cleaning fluids, for example washing liquid and/or final-rinse liquid, is applied to the washware in a targeted manner, preferably in a cleaning chamber. In this case, the washware should be, in principle, any desired item which can be used directly or indirectly for preparing, storing or serving food and/or beverages. In particular, the washware may be dishes and/or trays. Examples of washware include plates, cups, glasses, mugs, cups, dishes, bowls, cutlery, trays, pots, pans or storage containers. However, other types of washware are also feasible in principle. The dishwasher can comprise, in particular, one or more holders for holding the washware during a cleaning process, for example one or more dish racks and/or one or more glass racks.

The dishwasher comprises a cleaning chamber for accommodating the washware. In this case, a cleaning chamber is intended to be understood to mean, in general, a chamber which is surrounded by at least one housing and which is preferably designed to be completely closed.

The cleaning chamber can have, for example, one or more opening apparatuses which are called "door" in the text which follows, without restricting possible refinements. Therefore, within the scope of the invention, a door is intended to be understood to mean basically any desired apparatus by means of which the cleaning chamber can be entirely or partially opened, for example in order to insert washware into the cleaning chamber and/or in order to remove washware from the cleaning chamber. The door can be fitted, for example, into a wall of the cleaning chamber or can also form a constituent part of a wall of the cleaning chamber itself, so that the cleaning chamber is entirely or partially formed from the door. In particular, the door can be selected from the group comprising a hatch, a slide, a swing-open cover and a hood. Combinations of different types of doors are also possible. By way of example, the dishwasher can comprise one or more doors in the form of hatches and/or one or more hoods. For instance, the dishwasher, as will be explained in greater detail below, may be, in particular, a single-chamber dishwasher which is designed, for example, as a front-loader dishwasher with a door at the front, as a top-loader dishwasher with a door in the cover, or as a hood-type dishwasher, wherein the hood-type dishwasher can have a door in the form of a hood which can be moved upward for opening the cleaning chamber.

The dishwasher is designed to apply at least one washing liquid and at least one final-rinse liquid to the washware in the cleaning chamber. Washing liquid and final-rinse liquid are examples of a cleaning fluid for cleaning the washware. A washing liquid is intended to be understood to mean a liquid which can be used for washing impurities off from the washware during a coarse cleaning process. Said washing liquid may be, for example, an aqueous washing liquid which, in addition to water, comprises one or more cleaning chemicals, for example at least one detergent solution. In addition, said washing liquid can comprise further substances, such as disinfectants for example. Within the scope of the present invention, a final-rinse liquid is intended to be understood to mean a liquid which is designed to wash off residues of the washing liquid from the washware and to promote residue-free drying. The final-rinse liquid can be pure water, for example fresh water, and/or an aqueous final-rinse liquid with one or more additions, for example an addition of at least one final-rinse aid, for example a wetting agent, which promotes quick and residue-free draining of the final-rinse liquid from the washware. Detergent solutions and final-rinse aids of said type are well known to a person skilled in the art in the field of washing technology and are commercially available.

As will be explained in greater detail below, the washing liquid and/or the final-rinse liquid can be applied to the washware, in particular, at a temperature which is higher than room temperature. By way of example, the washing liquid can be at a temperature of from 50 to 80° C. and the final-rinse liquid can, for example, be at a temperature of from 80 to 95° C.

In order to apply the cleaning fluid, that is to say the washing liquid and/or the final-rinse liquid, to the washware, the dishwasher can have, in particular, at least one nozzle system having one or more nozzles from which the washing liquid and/or the final-rinse liquid emerges and can be applied to the washware. The nozzle system can be connected, for example, to at least one pipeline system by means of which the washing liquid and/or the final-rinse liquid are delivered to the nozzle system with single-circulation operation and/or with recirculation operation. In this case, the same nozzle system or separate nozzle systems can be used for the washing liquid and the final-rinse liquid.

The dishwasher has at least one controller. Within the scope of the present invention, a controller is intended to be understood to mean, in general, an apparatus which is designed to control and/or to regulate one or more processes of the dishwasher which are related to cleaning of the washware. By way of example, the controller can have at least one data-processing apparatus. The controller can be designed, in particular, centrally for the entire dishwasher and can control all of the functions of the dishwasher. However, as an alternative, a decentralized controller having a plurality of individual constituent parts which cooperate with one another is also possible. Furthermore, the controller can have at least one user interface, for example at least one keypad and/or at least one display.

The controller is designed to carry out at least one cleaning program. In this case, a cleaning program is intended to be understood to mean, in general, a defined or definable sequence of one or more method steps which serve the purpose of cleaning the washware. The method steps, also called cleaning steps and/or program steps in the text which follows, can be controlled, for example, by a computer program which runs in a data-processing apparatus of the controller. To this end, the controller can act, for example, on one or more actuators, for example one or more pumps and/or on one or more valves and/or one or more heating apparatuses in order to initiate the correct actions for carrying out the cleaning program, for example starting a pump and/or opening and/or closing valves, in each case at the correct time which is prespecified by the cleaning program.

Cleaning programs of this kind and the controller of cleaning programs of this kind are known in principle to a person skilled in the art. In particular, the cleaning program can be carried out in such a way that the washware remains in the same cleaning chamber during all of the program steps of the cleaning program. This is also called a stationary washing process in practice.

The cleaning program comprises at least one washing step, in which the washing liquid is applied to the washware, and at least one final-rinse step, in which the final-rinse liquid is applied to the washware. The application can be performed in each case, for example, by spraying, sprinkling, jetting or another type of application with which the washware can be brought into contact with the washing liquid and/or the final-rinse liquid. Said program steps are preferably carried out in said order, so that the washing step is carried out in the first instance, in order to then, immediately after said washing step or after a pause, apply the final-rinse liquid to the washware in the final-rinse step. In this case, a single washing step or a plurality of washing steps can be provided, for example in order to sequentially remove, in the first instance, coarse impurities and then to ensure fine removal of impurities. Furthermore, one or more final-rinse steps can be provided.

As will be explained in greater detail below, the cleaning program can comprise, in addition to the at least one washing step and the at least one final-rinse step, one or more additional method steps. For example, as will be explained in greater detail below, one or more draining steps can be included, for example in each case after the washing step and/or after the final-rinse step. Furthermore, as an alternative or in addition, one or more drying steps can be included, for example after carrying out the washing step. Once again as an alternative or in addition, one or more additional application steps can take place, concentrated detergent and/or a disinfectant additionally being applied to the washware, and this optionally being followed by one or more further washing steps, for example. Various refinements are feasible and known to a person skilled in the art in principle.

The cleaning apparatus has at least one operator control element which can be operated by a user. The operator control element can be, in particular, a constituent part of the at least one optional user interface, explained above, of the controller. In this case, an operator control element can be understood to mean, in principle, any desired element which allows a user of the dishwasher to initiate one or more actions of the dishwasher and/or in order to transmit one or more commands or one or more items of information to the controller. The operator control element may be, for example, a mechanical and/or electromechanical and/or electrical operator control element. By way of example, the operator control element can have at least one operator control element selected from the group comprising: a keypad, a switch, a momentary-contact switch, a lever, a pushbutton, a membrane-type momentary-contact switch or a combination of said and/or other operator control elements.

As explained above, after initiation, the cleaning program is executed in full, including the above-described problem of the possible formation of residues on the washware owing to delayed removal of the washware from the cleaning chamber, in conventional dishwashers. In order to eliminate this problem, it is proposed that the dishwasher and the controller are designed in such a way that the final-rinse step can be carried out at least once on the basis of operation of the operator control element after at least the washing step of the cleaning program has been carried out. Accordingly, the dishwasher provides the option of operating or once again operating the operator control element after at least the washing step of the cleaning program has been carried out, unconditionally or at least when one or more conditions are met, in order to carry out the final-rinse step of the cleaning program for the first time or once again.

As will be explained in greater detail below, operation of the operator control element can be enabled after at least the washing step of the cleaning program has been carried out, unconditionally or when one or more prespecified conditions are met. By way of example, this condition can be that the washware has not been removed from the cleaning chamber after the washing step and the final-rinse step and optionally at least one drying step have been carried out, but rather has remained in the cleaning chamber, for example for at least a prespecified period of time. If the condition is met, the operator control element can, for example, be enabled in order to initiate or once again initiate the final-rinse step.

The final-rinse step which can be initiated by operation of the operator control element can be a final-rinse step of the cleaning program which has been carried out for the first time or can be a final-rinse step which has been carried out once again. For instance, the cleaning program can in the first instance be executed in a regular manner, including the at least one washing step and the at least one final-rinse step, in order to then, in particular when the at least one condition is met, carry out the at least one final-rinse step once again on the basis of operation of the operator control element. However, as an alternative, the final-rinse step can also be carried out for the first time on the basis of operation of the operator control element. For instance, the at least one washing step can be carried out after the cleaning program is started, without being followed by the at least one final-rinse step in the first instance. Said final-rinse step can then be started by a user, for example, only on the basis of operation of the operator control element. When, for example, the user knows that he will wish to remove the washware from the dishwasher in the near future, said user can operate the operator control element, and the final-rinse step will be started, optionally followed by a drying step. The final-rinse step which can be carried out on the basis of operation of the operator control element can be a constituent part of the cleaning program or can be regarded as an additional, optional step.

As explained above, the cleaning program can comprise additional process steps. For instance, at least one drying step can be included. If the final-rinse step is carried out on the basis of operation of the operator control element, a drying step or a further drying step can also follow the final-rinse step on the basis of said operation of the operator control element. The two options that the cleaning program is in the first instance executed in full and including the drying step which follows the final-rinse step are once again possible in this case. If one or more conditions are then met and operation of the operator control element in order to once again carry out the final-rinse step is allowed on the basis of the one or more conditions being met, at least one drying step can again follow this renewed final-rinse step. As an alternative refinement, in which the final-rinse step is carried out for the first time on the basis of operation of the operator control element, the drying step can follow said final-rinse step for the first time.

As explained above, the controller can thus be designed to carry out the cleaning program in the first instance in full and including the washing step and the final-rinse step. The final-rinse step and optionally the drying step can then be carried out at least once again on the basis of operation of the operator control element. Accordingly, by way of example, the operator control element can be enabled in order to allow the final-rinse step and optionally the drying step, initiated by a user by means of operation of the operator control element, to be carried out once again after the cleaning program including the washing step and the final-rinse step has been carried out in full. As explained above, said enabling of the operator control element can be made dependent on one or more conditions, such as a residence time of the washware in the cleaning chamber for at least a prespecified time or for longer than a prespecified time period for example.

The controller can accordingly be designed to identify whether at least one prespecified or prespecifiable condition has been met, and can be designed to make enabling of the operator control element dependent on this at least one condition being met. By way of example, the controller can be designed to identify whether the washware has remained in the cleaning chamber for longer than a prespecified time period after the cleaning program, including the washing step and the final-rinse step and optionally a drying step, has been carried out. By way of example, a time at which the at least one final-rinse step of the elapsed cleaning program or, if present, a subsequent draining step or a subsequent drying step has elapsed can be defined as the program end time. Starting from this program end time, the time period which passes or has passed without the washware having been removed from the cleaning chamber can then be detected, and this time period can be compared with the predefined time period as a threshold value in order to check whether the condition for enabling the operator control element is met or not. The controller can accordingly be designed to allow the final-rinse step and optionally the drying step to be carried out once again on the basis of operation of the operator control element when this condition is identified, that is to say when it is identified that this condition has been met. In other words, the operator control element can be enabled depending on this condition being met.

Therefore, the prespecified time period can be a threshold time value. A residence time of the washware after the cleaning program has been carried out can be detected, for example, by detecting whether a door of the cleaning apparatus has been opened in a way that allows the washware to be removed from the cleaning chamber. As an alternative or in addition, one or more sensors which identify whether there is washware in the cleaning chamber can be provided. In this case, said sensors may be, for example, optical sensors, such as light barriers and cameras with image recognition for example, or other types of sensors which can be provided individually or in groups and which can identify whether there is washware in the cleaning chamber or not. Accordingly, the time period after the cleaning program has been completed can be detected and compared with one or more threshold values, specifically with the at least one prespecified time period. This time period, which can function as a threshold value, can lie, for example, in a range of from 1 minute to 15 minutes. By way of example, the threshold value can be a time period of 2 minutes.

As explained above, the condition that the washware has remained in the cleaning chamber for longer than the prespecified time period after the cleaning program has been carried out can be identified in various ways. For instance, at least one sensor can be used. As an alternative or in addition, the cleaning apparatus, in particular the controller, can also be designed to identify opening of a door of the cleaning apparatus. For instance, the controller can be designed to compare a time period for the door being open with at least one threshold value, wherein this threshold value can represent, for example, an empirical value in respect of a minimum period for removing the washware from the cleaning chamber. It is then possible to conclude, for example, that the washware has been removed from the cleaning chamber when the threshold value is exceeded. If no removal of this kind has been established, for example after the abovementioned time period has elapsed, the operator control element can, for example, be enabled to carry out the final-rinse step, in particular to carry out the final-rinse step, including optionally at least one following drying step, once again. The threshold value which can contain a minimum time period for removal of the washware from the cleaning chamber can lie, for example, in a range of from 1 second to 10 seconds, for example in a range of from 2 seconds to 8 seconds.

In particular, the cleaning apparatus can, as explained above, have at least one sensor for detecting at least one state of the washware and/or of the dishwasher. The controller can be designed to allow the final-rinse step to be carried out once again on the basis of operation of the operator control element by a user depending on the detected state. The detected state may be, for example, loading of the dishwasher with the washware. In this way, the at least one sensor can be used to establish, for example, whether the washware has remained in the cleaning chamber. This can be combined with the abovementioned threshold value method in which a residence time of the washware in the cleaning chamber after the cleaning program has been carried out is detected by the at least one sensor and is compared with at least one threshold value in the form of the prespecified time period. The prespecified time period can lie, for example, as explained above, in the range of from 1 minute to 15 minutes, for example at 2 minutes or 5 minutes.

In general, the controller can be designed to enable the operator control element for operation only after the washing step has been carried out. By way of example, this enabling, as explained above, can be performed after the cleaning program, including the washing step and the final-rinse step and optionally the at least one drying step, has been carried out in full. Furthermore, enabling the operator control element can be made dependent, as explained above, on at least one condition, for example using the abovementioned threshold value method for the residence time of the washware in the cleaning chamber after the washing program has been carried out.

The controller can be designed, in particular, to indicate to a user an enabled state of the operator control element by way of at least one signal. The signal can be selected, in particular, from the group comprising: an optical signal, in particular a light signal, a flashing signal, a color change or an item of information which is output on a display; an audible signal, for example a signal tone; a haptic signal, for example vibration of a handle of the dishwasher. For instance, in general, the operator control element can be completely or partially designed as a signal element and can be designed to output the at least one signal to the user.

The operator control element can comprise, for example, a program start switch which can be operated by a user. By way of example, the cleaning program can be started by means of this program start switch. The program start switch can furthermore be designed with several functions in order to start, in particular to restart, the final-rinse step on the basis of renewed operation after at least the washing step has been carried out. Accordingly, the same program start switch, for example a program start momentary-contact switch, can be used for starting the cleaning program and for starting the final-rinse step, in particular the new final-rinse step.

For instance, the operator control element can be designed, in general, to fulfill at least a dual function. In addition to the function of starting the final-rinse step, in particular starting the final-rinse step once again, said dual function contains at least one further function, for example starting the at least one cleaning program. By way of example, the controller can be designed to enable the function of the operator control element, in which function the final-rinse step is carried out on the basis of operation of the operator control element after at least the washing step of the cleaning program has been carried out, only when at least one condition of the dishwasher, in particular the abovementioned time condition in respect of the residence time of the washware in the cleaning chamber after the washing program has been carried out, is met.

In general, the dishwasher can, as explained above, be designed to transmit at least one signal to the user, said signal indicating that the final-rinse step can be carried out, in particular can be carried out once again, on the basis of operation of the operator control element. In particular, the signal can, as explained above, be selected from amongst an audible signal, an optical signal and a haptic signal The dishwasher can be designed, in particular, to selectively carry out a plurality of cleaning programs. For instance, the controller can be designed to carry out a plurality of cleaning programs. By way of example, a user of the dishwasher can select the cleaning program which is to be carried out from amongst a plurality of cleaning programs by means of the at least one optional user interface. From amongst this plurality of cleaning programs, at least two of the cleaning programs should each comprise the at least one washing step and the at least one final-rinse step. In this case, the controller should be designed in such a way that the final-rinse step of at least one of the cleaning programs can be carried out at least once on the basis of operation of the operator control element after the washing step has been carried out, according to the above description, wherein the controller is further designed in such a way that the final-rinse step of at least a second of the cleaning programs can be carried out independently of operation of the operator control element after the washing step has been carried out. In other words, at least one cleaning program according to the invention, in which cleaning program the controller is designed in such a way that the final-rinse step can be carried out at least once on the basis of operation of the operator control element after at least the washing step has been carried out, and at least one cleaning program which is not designed in this way and in which the final-rinse step is independent of operation of the operator control element after the washing step has been carried out should be provided.

The dishwasher can have, in particular, at least one wash tank which is connected to the cleaning chamber. By way of example, this wash tank can be formed in the bottom of the cleaning chamber. By way of example, the at least one washing step can be carried out with recirculation operation using washing liquid from the wash tank by, for example, a pipeline system having at least one pump and at least one nozzle system being provided, said pipeline system being connected to the wash tank. In addition to the at least one wash tank, the dishwasher can optionally further have at least one final-rinse tank which is formed separately from the wash tank. The final-rinse liquid can be treated, preferably independently of liquid contained in the wash tank, in the final-rinse tank. By way of example, the final-rinse tank can be connected to a nozzle system of the dishwasher by means of a pipeline system, wherein this pipeline system, which can be specially designed for the final-rinse process, can once again comprise a final-rinse pump for example. Treatment of the final-rinse liquid in the wash tank can be understood to mean, for example, heating of the final-rinse liquid and/or addition of one or more additives to the final-rinse liquid, for example a wetting agent and/or a final-rinse aid. The final-rinse tank can have, in particular, at least one heating apparatus for heating the final-rinse liquid, for example a heating apparatus selected from amongst a boiler and a throughflow heater. The final-rinse tank can be fed, for example, via a fresh-water connection which can be connected, for example, to a fresh-water connection of the building.

The final-rinse step can comprise, in particular, a fresh-water final-rinse step. In this case, a fresh-water final-rinse step is intended to be understood to mean a final-rinse step using fresh water as final-rinse liquid. However, one or more additives, for example a rinse aid, can be added to the fresh water. Furthermore, the fresh water can also be heated, for example by means of at least one boiler and/or by means of at least one throughflow heater.

As explained above, the dishwasher can be designed, in particular, as a commercial dishwasher, that is to say as a dishwasher which has at least two tanks, specifically the at least one wash tank and furthermore at least the final-rinse tank. This ensures that the final-rinse liquid in the final-rinse tank is treated independently of a washing step which is carried out using the wash tank. Accordingly, the final-rinse step can be carried out immediately following the washing step, so that a faster cycle is possible.

The dishwasher can be designed, in particular, as a single-chamber dishwasher, that is to say as a dishwasher which has precisely one cleaning chamber. The washware can remain stationary in this one cleaning chamber.

As demonstrated above, the dishwasher can be selected, in particular, from amongst the group comprising a front-loader dishwasher, a top-loader dishwasher and a hood-type dishwasher. In this case, a front-loader dishwasher is intended to be understood to mean, in general, a dishwasher which has a door on its front face, it being possible to insert the washware into the cleaning chamber and/or to remove said washware from the cleaning chamber through said door. Analogously, a top-loader dishwasher is intended to be understood to mean a dishwasher which has a corresponding door for loading and/or unloading the dishwasher from its top face. Accordingly, a hood-type dishwasher is intended to be understood to mean a dishwasher in which the cleaning chamber is formed entirely or partially by a hood which can be removed from the base of the dishwasher in order to allow the dishwasher to be loaded and/or unloaded. Therefore, in this case, the hood itself forms the door within the meaning of the above definition and/or a part of said door. By way of example, the hood can be moved upward, for example by means of corresponding guidance using at least one counterweight, so that the hood can be shifted upward by a user.

Therefore, the dishwasher can be designed, in particular, as a box-type dishwasher. The at least one cleaning program, or if a plurality of cleaning programs are provided, at least one of the cleaning programs can further comprise at least one drying step. By way of example, heated air and/or fresh air can be applied to the washware in the drying step. The controller can be designed, in particular, to carry out the drying step after the final-rinse step has been carried out. As explained above, the drying step can be carried out once or repeatedly. For instance, as explained above, the controller can be designed firstly in such a way that the final-rinse step is carried out for the first time after operation of the operator control element after the at least one washing step has been carried out, this being followed by the at least one drying step which can then likewise be carried out for the first time. As an alternative, as explained above, the controller can also be designed in such a way that the cleaning program is carried out in the first instance in full and including the at least one washing step and the at least one final-rinse step and optionally the at least one drying step, and then the final-rinse step is carried out at least once again on the basis of operation of the operator control element, this being followed by a further drying step. For instance, the controller can be designed, in general, to carry out the drying step at least once following the final-rinse step which has been carried out on the basis of operation of the operator control element.

As explained above, the controller of the dishwasher can preferably be designed to carry out the cleaning program in the first instance in full and including the washing step and the final-rinse step. The controller can further be designed to detect a residence time after the cleaning program has been carried out, that is to say a time period for which the washware has remained in the cleaning, after the cleaning program has been carried out, that is to say after the cleaning program has been completed. As already explained above, this residence time can be compared with one or more threshold values in order to carry out one or more actions in accordance with this comparison. As has already been explained above, the operator control element can be enabled, for example, in accordance with this comparison. For instance, the controller can be designed to identify that the washware has remained in the cleaning chamber for longer than a prespecified time period after the cleaning program has been carried out, and to allow the final-rinse step to be carried out once again on the basis of operation of the operator control element only when this condition is identified.

However, as an alternative or in addition, one or more other actions can also be carried out in accordance with the comparison of the residence time with one or more threshold values. For instance, a final-rinse step can be automatically carried out once again on the basis of an established residence time. In this case, the residence time can be compared with a second prespecified time period which can be identical to the prespecified time period which was used to enable the operator control element (also called the first time period) or which can be different from this first time period. For instance, as explained above, one or more threshold values can be used. By way of example, this second prespecified time period can lie in a range of from 5 minutes to 1 hour, in particular in a range of from 10 minutes to 45 minutes. However, other values are also possible.

Accordingly, the controller can be designed, for example, to carry out the cleaning program in the first instance in full and including the washing step and the final-rinse step. The controller can further be designed to identify that the washware has remained in the cleaning chamber for longer than the prespecified second time period after the cleaning program has been carried out, and to automatically start a new final-rinse step when this condition is identified. In this respect, automatic starting is intended to be understood to mean starting of the final-rinse step which no longer requires repeated user intervention.

After the new final-rinse step has been carried out, the residence time in this variant, in which the new final-rinse step is executed automatically, or in the abovementioned variant, in which the new final-rinse step is carried out on the basis of operation of the operator control element, can be reset to 0, so that the new residence time is then measured, for example, starting from completion of the new final-rinse step. This new residence time can then be compared with one or more threshold values again, so that both said variants are carried out once again. For instance, when it is established that the new residence time has exceeded a prespecified time period or a prespecified second time period for example, the operator control element can be enabled once again and/or a new final-rinse step can be automatically started.

Therefore, in general, it is also possible to automatically start a new final-rinse step when a residence time which exceeds one or more threshold values (for example the first prespecified time period and/or the second prespecified time period) is identified. This automatic restarting can also take place iteratively, so that, for example, when the washware remains in the cleaning chamber over a relatively long time, a new final-rinse step is automatically started at regular intervals (for example every 5 minutes to 30 minutes). For instance, temporary or else permanent soiling of or even damage to the washware can be efficiently avoided.

A method for cleaning washware, in particular a washing method and particularly preferably a glass-washing method, is proposed in a further aspect of the present invention. Reference can be made to the above description in respect of possible forms of the washware.

The method comprises, preferably sequentially, applying at least one washing liquid and at least one final-rinse liquid to the washware in a cleaning chamber. This application is performed while or within the scope of carrying out at least one cleaning program. The cleaning program comprises at least one washing step, in which the washing liquid is applied to the washware, and at least one final-rinse step, in which the final-rinse liquid is applied to the washware. The method further comprises use of at least one operator control element which can be operated by a user. The final-rinse step can be carried out at least once on the basis of operation of the operator control element after at least the washing step of the cleaning program has been carried out.

The method can be carried out, in particular, using the dishwasher according to one or more of the above-described refinements or refinements which will be described in greater detail below. Accordingly, reference can be made to the above description or the following description of preferred embodiments of the dishwasher in respect of possible refinements of the method, or vice versa. However, other refinements are also possible in principle.

For instance, the method can be designed, for example, in such a way that in the first instance the cleaning program is carried out in full and including the washing step and the final-rinse step and optionally at least one drying step, and wherein the final-rinse step can then be carried out, in particular is carried out, once again on the basis of operation of the operator control element.

Furthermore, the method can be designed in such a way that it is identified whether the washware has remained in the cleaning chamber for longer than a prespecified time period after the cleaning program has been carried out, and operation of the operator control element to carry out the final-rinse step once again is allowed only when this condition is identified.

Reference can be made to the above description of the dishwasher in respect of further possible refinements of the method.

The dishwasher and the method according to the present invention have a large number of advantages over known dishwashers and methods. In particular, the above-described problem of it not always being possible to remove the washware in a timely fashion in practice is at least partially solved. However, carrying out the washing step as required or once again on the basis of operation of the operator control element, in particular additional and deliberate fresh-water final rinsing, can at least partially eliminate the above-described problem. The use of resources required for this purpose is manageable, and the additional time period which may be required for the final-rinse step, in particular the additional final-rinse step, can be tolerated in practice. The additional consumption of resources could even be avoided by the final-rinse step being decoupled from the rest of the washing process and accordingly the final-rinse step and possibly drying being performed only in response to a user request by means of the operator control element.

As explained above, there is a high degree of flexibility in respect of the design of the cleaning program and in respect of the initiation of the final-rinse step by means of the operator control element. For instance, the final-rinse step can be designed, in particular, as an additional final-rinse step, possibly including additional drying. The final-rinse step, including the optional drying, can accordingly be the corresponding process step of the entire process or else a modified process step. In particular, a reduced quantity of final-rinse liquid, in particular of fresh water, may be required in the event of subsequent activation of the final-rinse step after the rest of the cleaning program has been performed, and therefore the final-rinse step may also turn out to be shorter than conventional final-rinse steps.

The dishwasher can be designed, in particular, as a box-type dishwasher and/or as a dishwasher with a stationary dishwashing method. The dishwasher can be equipped, in particular, with the option of executing the final-rinse step at the request of the user. In this case, as explained above, the operator control element can be a special operator control element which is provided only for triggering the final-rinse step, or can be an operator control element which fulfils several functions. In the latter case, by way of example, an existing operator control element which has a dual or multiple function can be used and, when it is operated, can trigger the final-rinse step under certain conditions.

If a special operator control element is provided solely for triggering the final-rinse step, said operator control element may be, for example, a button and/or a switch. As an alternative or in addition, the operator control element can also be coupled, for example, to existing constituent parts of the dishwasher, for example to a door, in this or else in other cases. For instance, the dishwasher can be designed, for example, in such a way that brief opening of the door and/or of the hood is identified by the controller and accordingly is interpreted as a request for a separate final-rinse step. For instance, the operator control element can be integrated entirely or partially into a door of the dishwasher, and brief opening of the door, for example up to a time period of 3 seconds to at most 10 seconds or less, can be interpreted as operation of the operator control element, so that the final-rinse step can be triggered on the basis of this operation. Brief opening of the door of this kind is generally too short for removal of the washware from the cleaning chamber and/or loading of the cleaning chamber with washware and therefore, in general, can be reliably interpreted as operation of the operator control element. Accordingly, by way of example, an opening time of a door of the dishwasher can therefore be detected and compared with a maximum threshold value which can lie, for example, in a range of from 0.5 seconds$\leq t <$10 seconds. If the door is open for a time period below this threshold value, this can be interpreted as operation of the operator control element, and the above-described final-rinse step, in particular the additional final-rinse step, can be triggered.

As explained above, an operator control element with a multiple function can also be used as the operator control element. For instance, an operator control element which otherwise is used or can be used in some other way, that is to say for at least one function apart from triggering the final-rinse step, can be used. This operator control element can be allocated in a time-dependent manner, so that said operator control element can be temporarily used for triggering the final-rinse step. By way of example, the operator control element can be allocated in a time-dependent manner such that said operator control element initiates activation of the final-rinse step only under the correct boundary conditions.

A basis for this may be identification of the applicable boundary conditions. For instance, as explained above, one or more boundary conditions may involve at least the washing step, preferably an entire cleaning program, being terminated and the door and/or hood not having been opened, at least not for longer than a prespecified threshold value for removal of the washware. Furthermore, at least a prespecified time period, for example a time period of at least 1 minute, for example at least 2 minutes, should have elapsed after the end of the program.

If one or more conditions and/or boundary conditions are met, the operator control element with a multiple function can then be functionally allocated in such a way that operation of the operator control element triggers the final-rinse step. This can be signaled to the user, for example, in an optical, audible or haptic manner or by a combination of said options. By way of example, a program start button can start to flash at the end of the program after the defined time has elapsed and in this way signal that operating the program start button once again can start the final-rinse step and optionally the following drying step. After the door, for example the hatch and/or hood, has been open for longer than a prespecified time period, for example for longer than 3 seconds, the program start button can optionally start in the normal mode by restarting the entire program when it is operated.

The user interface, for example a display of the user interface, can optionally display a message after the defined time has elapsed, said message conveying that immediate removal will not yield the optimum drying result and that it is therefore recommended to start or restart the final-rinse step, for example the fresh-water final rinsing, and optionally drying by operating the operator control element (for example the program start button). In this case, an abort criterion for the internal elapsing of time can once again be corresponding opening of a door, for example opening of a hatch and/or a hood of the dishwasher.

The dishwasher can further be designed in such a way to provide the final rinsing, which is activated by the operator control element, only in one or more programs, for example only in a glass program, whereas such additional activation of the final-rinse step by operation of the operator control element is not possible in one or more further programs.

The dishwasher, in particular the controller of the dishwasher, can also be designed to learn, in particular to carry out a self-learning process. For instance, a time period which passes on average between an end of the cleaning program and opening of the door, in particular a hatch and/or hood of the cleaning chamber, can be detected over a plurality of cleaning programs. By way of example, the prespecified time period, that is to say the threshold value, which has to be passed to enable the final-rinse step to be carried out once again on the basis of operation of the operator control element can then be established in accordance with this average time period, which is ascertained as part of a learning process. As an alternative or in addition, the time period which is required on average for loading the dishwasher with washware and/or removing the washware from the dishwasher can be detected, so that the abovementioned threshold value, which characterizes removal of the washware from the cleaning chamber, is established by a learning process. Accordingly, the dishwasher can adapt to the habits of the user and/or usual operating cycles. The basis for a survey of this kind and/or a learning process of this kind can be, for example, the last 10, the last 20 or the last 50 program cycles. However, other scenarios, such as scenarios which are related to the time of day and/or clusters for example, are also conceivable.

As explained above, the dishwasher could again decouple the washing operation from the final-rinse operation or the final-rinse operation including drying. However, execution of the entire program with a subsequently repeated final-rinse step, optionally including the drying step, is advantageous since immediate removal of washware after the end of the program without user action is possible under this condition.

The proposed dishwasher and the proposed method provide a user with the option of achieving an optimum drying result or at least a drying result which is improved in comparison to conventional apparatuses and methods. This improvement is achieved even if the washware is not removed from the cleaning chamber within an optimum period of time. Furthermore, this improved cleaning result can be achieved without subsequent polishing and/or without repeating the entire cleaning program. For instance, only the final-rinse step and optionally the drying step can be started or restarted, for example without the washing step being repeated, on the basis of operating the operator control element once again.

The dishwasher can learn from the past and/or from the user behavior and enable triggering of the additional final-rinse step and optionally additional drying in such a way that a user is provided with good preconditions for dry washware with an improved drying result with a high degree of probability.

In summary, the following embodiments are particularly preferred within the scope of the present invention:

Embodiment 1

Dishwasher, comprising a cleaning chamber for accommodating washware, wherein the dishwasher is designed to apply at least one washing liquid and at least one final-rinse liquid to the washware in the cleaning chamber, wherein the dishwasher has a controller, wherein the controller is designed to carry out at least one cleaning program, wherein the cleaning program comprises at least one washing step, in which the washing liquid is applied to the washware, and at least one final-rinse step, in which the final-rinse liquid is applied to the washware, wherein the dishwasher has at least one operator control element which can be operated by a user, wherein the controller is designed in such a way that the final-rinse step can be carried out at least once on the basis of operation of the operator control element after at least the washing step of the cleaning program has been carried out.

Embodiment 2

Dishwasher according to the preceding embodiment, wherein the controller is designed to carry out the cleaning program in the first instance in full and including the washing step and the final-rinse step, and then to carry out the final-rinse step at least once again on the basis of operation of the operator control element.

Embodiment 3

Dishwasher according to the preceding embodiment, wherein the controller is designed to identify that the washware has remained in the cleaning chamber for longer than a prespecified time period after the cleaning program has been carried out, and to allow the final-rinse step to be carried out once again on the basis of operation of the operator control element only when this condition is identified.

Embodiment 4

Dishwasher according to the preceding embodiment, wherein the prespecified time period lies in a range of from 1 minute to 15 minutes.

Embodiment 5

Dishwasher according to one of the two preceding embodiments, wherein the condition that the washware has remained in the cleaning chamber for longer than the prespecified time period after the cleaning program has been carried out is identified on the basis of opening of a door of the dishwasher being identified.

Embodiment 6

Dishwasher according to the preceding embodiment, wherein the controller is designed to compare a time period for the door being open with at least one threshold value and to conclude that the washware has been removed from the cleaning chamber when the threshold value is exceeded.

Embodiment 7

Dishwasher according to the preceding embodiment, wherein the threshold value lies in a range of from 1 second to 10 seconds.

Embodiment 8

Dishwasher according to one of the six preceding embodiments, wherein the dishwasher has at least one sensor for detecting at least one state of the washware and/or of the dishwasher, wherein the controller is designed to allow the final-rinse step to be carried out once again on the basis of operation of the operator control element depending on the detected state.

Embodiment 9

Dishwasher according to one of the preceding embodiments, wherein the controller is designed to enable the operator control element for operation only after the washing step has been carried out.

Embodiment 10

Dishwasher according to one of the preceding embodiments, wherein the controller is designed to indicate an enabled state of the operator control element to a user by way of at least one signal.

Embodiment 11

Dishwasher according to the preceding embodiment, wherein the signal is selected from the group comprising: an optical signal, in particular a light signal, a flashing signal, a color change or an item of information which is output on a display; an audible signal; a haptic signal.

Embodiment 12

Dishwasher according to one of the two preceding embodiments, wherein the operator control element is designed as a signal element and is designed to output the signal to the user.

Embodiment 13

Dishwasher according to one of the preceding embodiments, wherein the operator control element comprises a program start switch which can be operated by a user, wherein the program start switch is designed to start the cleaning program, and wherein the program start switch is further designed to start, in particular to restart, the final-rinse step on the basis of new operation after at least the washing step has been carried out.

Embodiment 14

Dishwasher according to one of the preceding embodiments, wherein the operator control element is designed to fulfill at least a multiple function.

Embodiment 15

Dishwasher according to the preceding embodiment, wherein the controller is designed to enable the function of the operator control element, in which function the final-rinse step is carried out on the basis of operation of the operator control element after at least the washing step of the cleaning program has been carried out, only when at least one condition of the dishwasher is met.

Embodiment 16

Dishwasher according to one of the preceding embodiments, wherein the dishwasher is designed to transmit at least one signal to the user, said signal indicating that the final-rinse step can be carried out on the basis of operation of the operator control element.

Embodiment 17

Dishwasher according to the preceding embodiment, wherein the signal is selected from amongst an audible signal, an optical signal and a haptic signal.

Embodiment 18

Dishwasher according to one of the preceding embodiments, wherein the controller is designed to selectively carry out a plurality of cleaning programs, wherein at least two of the cleaning programs each comprise the at least one washing step and the at least one final-rinse step, wherein the controller is designed in such a way that the final-rinse step of at least a first of the cleaning programs can be carried out at least once on the basis of operation of the operator control element after the washing step has been carried out, and wherein the controller is further designed in such a way that the final-rinse step of at least a second of the cleaning programs can be carried out independently of operation of the operator control element after the washing step has been carried out.

Embodiment 19

Dishwasher according to one of the preceding embodiments, wherein the dishwasher has at least one wash tank which is connected to the cleaning chamber, wherein the dishwasher further has at least one final-rinse tank which is formed separately from the wash tank, wherein the final-rinse liquid can be treated independently of liquid contained in the wash tank in the final-rinse tank.

Embodiment 20

Dishwasher according to the preceding embodiment, wherein the final-rinse tank has at least one heating apparatus for heating the final-rinse liquid, in particular a heating apparatus selected from amongst a boiler and a throughflow heater.

Embodiment 21

Dishwasher according to one of the preceding embodiments, wherein the final-rinse step comprises a fresh-water final-rinse step.

Embodiment 22

Dishwasher according to one of the preceding embodiments, wherein the dishwasher is designed as a single-chamber dishwasher.

Embodiment 23

Dishwasher according to one of the preceding embodiments, wherein the dishwasher is selected from amongst a front-loader dishwasher, a top-loader dishwasher and a hood-type dishwasher.

Embodiment 24

Dishwasher according to one of the preceding embodiments, wherein the cleaning program further comprises at least one drying step, wherein the controller is designed to carry out the drying step after the final-rinse step has been carried out.

Embodiment 25

Dishwasher according to the preceding embodiment, wherein the controller is designed to carry out the drying step at least once following the final-rinse step which was carried out on the basis of operation of the operator control element.

Embodiment 26

Dishwasher according to one of the preceding embodiments, wherein the controller is designed to carry out the cleaning program in the first instance in full and including the washing step and the final-rinse step, wherein the controller is further designed to identify that the washware has remained in the cleaning chamber for longer than a pre-specified second time period after the cleaning program has been carried out, and to automatically start a new final-rinse step when this condition is identified.

Embodiment 27

Method for cleaning washware, comprising applying at least one washing liquid and at least one final-rinse liquid to the washware in a cleaning chamber, wherein at least one cleaning program is carried out, wherein the cleaning program comprises at least one washing step, in which the washing liquid is applied to the washware, and at least one final-rinse step, in which the final-rinse liquid is applied to the washware, wherein the method further comprises use of at least one operator control element which can be operated by a user, wherein the final-rinse step can be carried out at least once on the basis of operation of the operator control element after at least the washing step of the cleaning program has been carried out.

Embodiment 28

Method according to the preceding embodiment, wherein in the first instance the cleaning program is carried out in full and including the washing step and the final-rinse step, and wherein the final-rinse step can then be carried out once again on the basis of operation of the operator control element.

Embodiment 29

Method according to one of the two preceding embodiments, wherein it is identified whether the washware has remained in the cleaning chamber for longer than a pre-specified time period after the cleaning program has been carried out, and operation of the operator control element to carry out the final-rinse step once again is allowed only when this condition is identified.

Embodiment 30

Method according to one of the preceding embodiments which relates to a method, wherein the method is carried out using the dishwasher according to one of the preceding embodiments which relates to a dishwasher.

BRIEF DESCRIPTION OF THE FIGURES

Further details and features of the invention are evident from the following description of preferred exemplary embodiments, in particular in conjunction with the dependent claims. In this case, the respective features can be realized by themselves or as a plurality in combination with one another. The invention is not restricted to the exemplary embodiments. The exemplary embodiments are schematically illustrated in the figures. In this case, identical reference numerals in the individual figures designate elements that are identical or functionally identical or correspond to one another in respect of their functions.

Specifically.

DESCRIPTION OF THE EXEMPLARY EMBODIMENTS

Figure 1:
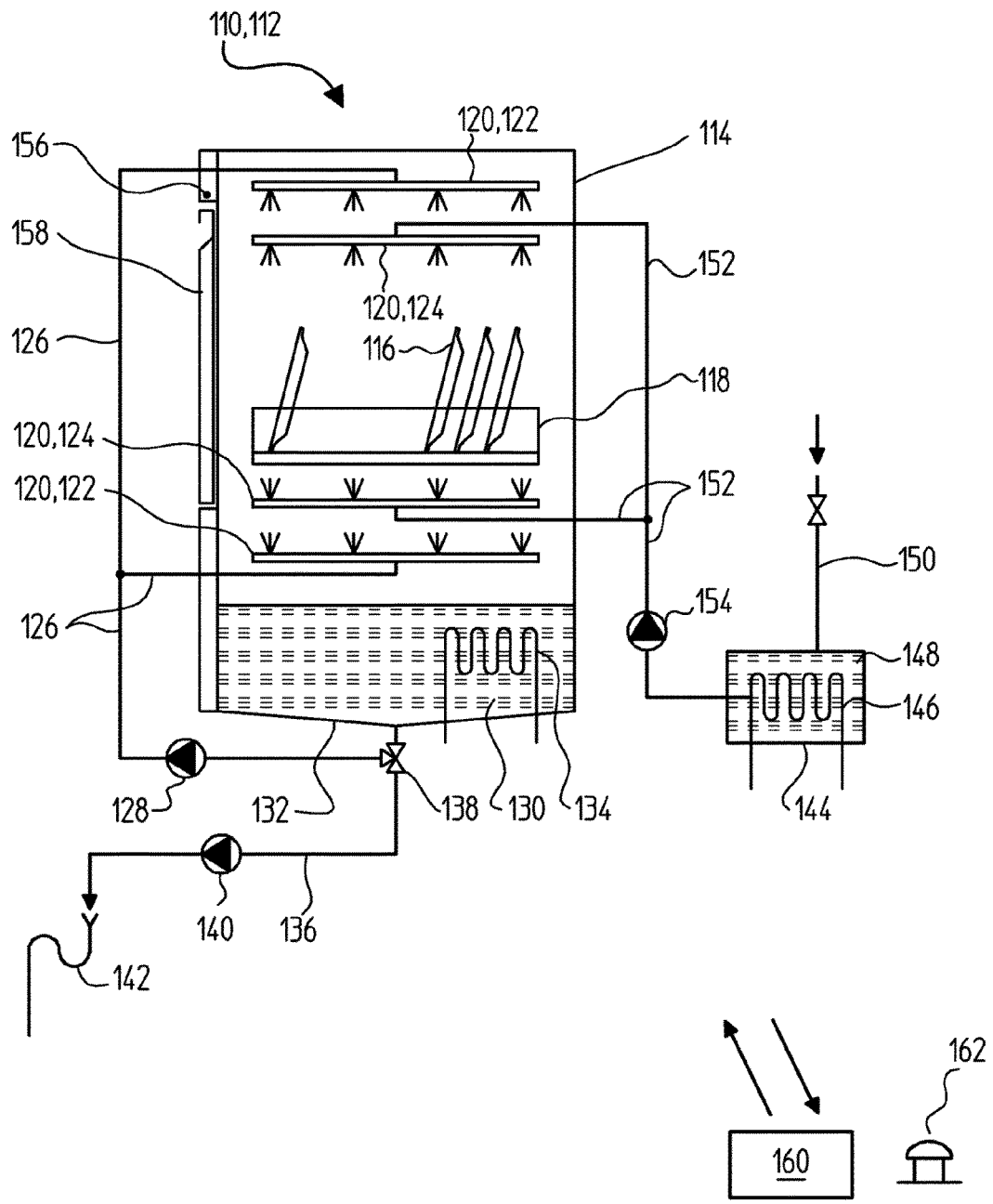
FIG. 1 shows a schematic exemplary embodiment of a dishwasher according to the invention.

An exemplary embodiment of a dishwasher 110 according to the invention which, in this exemplary embodiment, is designed as a single-chamber dishwasher 112 and which has a cleaning chamber 114 is illustrated in FIG. 1. Washware 116 can be accommodated in the cleaning chamber 114, for example by means of at least one washware rack 118, and at least two different types of cleaning fluid can be applied to said washware. The washware 116 can be, for example, items which are designed for preparing, serving or storing food. Plates are illustrated by way of example in this exemplary embodiment, but other types of dishes can also be used for example.

For the purpose of applying the cleaning fluid to the washware 116, the dishwasher 110 has a fluid apparatus 120 which is of two-part design in this exemplary embodiment. For instance, the fluid apparatus 120 has a washing nozzle system 122 and a final-rinse nozzle system 124. The washing nozzle system 122 can be supplied with washing liquid 130 from a tank 132 via washing lines 126 and a washing pump 128. The wash tank 132 can optionally have a heating apparatus 134. The wash tank 132 can be emptied into an outflow 142 via an outlet line 136, a 3-way valve 138 and optionally an outlet pump 140. Therefore, a washing step in which washing liquid 130 is applied to the washware 116 in recirculation operation from the wash tank 132, or in which the wash tank 134 is emptied into the outflow 142, can be selectively carried out by correspondingly switching the a-way valve 138 and the pumps 128, 140.

In addition to the wash tank 132, the dishwasher 110 comprises a final-rinse tank 144, which preferably likewise comprises a heating apparatus 146, in the illustrated exemplary embodiment. By way of example, the final-rinse tank 144 can be entirely or partially designed as a boiler. The final-rinse tank 144 serves to accommodate final-rinse liquid 148 and can be supplied with fresh water, for example via a fresh-water feed line 150.

The final-rinse nozzle system 124 can be supplied with final-rinse liquid 148 from the final-rinse tank 144 via final-rinse lines 152 and a final-rinse pump 154. This supply operation is preferably performed in a single operation within the scope of one or more final-rinse steps.

Furthermore, the dishwasher 110 can comprise one or more further apparatuses which are not illustrated in the present case. For instance, one or more metering devices can be provided, for example in order to meter one or more additives into the wash tank 132 and/or the final-rinse tank 144. For instance, a detergent concentrate can be mixed with the washing liquid 130 in the wash tank 132. By way of example, a rinse aid can be added to the final-rinse liquid 148 in the final-rinse tank 144.

Furthermore, the dishwasher 110 can comprise one or more sensors, for example one or more filling level sensors and/or one or more turbidity sensors and/or one or more sensors which can detect the presence of the washware 116 in the interior of the cleaning chamber 114. Furthermore, at least one opening sensor 156 can optionally be provided, it being possible for said opening sensor to be designed, for example, as a magnet sensor and to register opening of a door 158 of the cleaning chamber 114.

The dishwasher 110 further comprises a controller 160. The controller 160 can be connected, for example, to one, several or all of the actuators which are provided in the dishwasher 110, for example to one or more of the valves, such as the 3-way valve 138 for example, and/or to one or several or all of the pumps 128, 140 and 154. Accordingly, the controller 160 can be designed to completely or partially control a program cycle of at least one cleaning program in the dishwasher 110. Furthermore, the controller 160 can be connected to one, several or all of the sensors of the dishwasher 110, for example to the opening sensor 156.

As explained above, the controller 160 is designed to carry out at least one cleaning program, wherein the cleaning program comprises at least one washing step, in which the washing liquid 130 is applied to the washware 116, and at least one final-rinse step, in which the final-rinse liquid 148 is applied to the washware 116. Furthermore, at least one drying step can be provided, in which drying step the washware 116 can be dried, for example, simply on the basis of heating, draining or else application of an air stream, for example a heated air stream.

Figure 2:
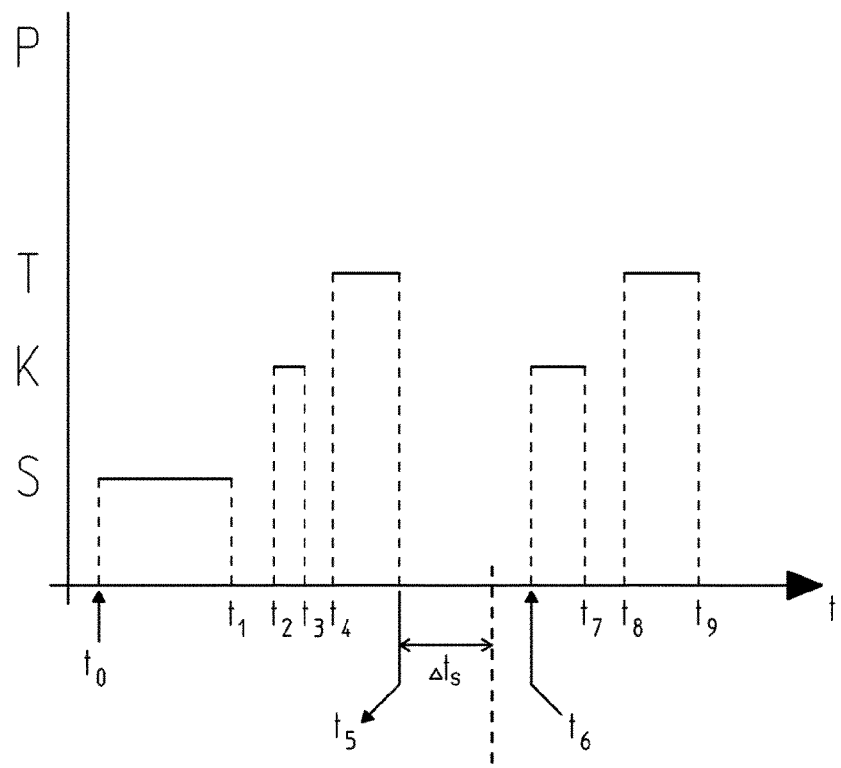
FIG. 2 shows an exemplary embodiment of a method according to the invention for cleaning washware.

An exemplary embodiment of a cleaning program according to the invention is schematically illustrated in FIG. 2. In this case, the program steps which are denoted by P are plotted on the vertical axis, with the washing step being denoted by S, the final-rinse step being denoted by K and the drying step being denoted by T. The horizontal axis which is denoted by t denotes a course of time. For instance, a prespecified cleaning program, for example a cleaning program which can be selected by a user from a list of possible cleaning programs, can be started at a time $t_0$. The cleaning program comprises the washing step, the final-rinse step and the optional drying step. The durations of these steps are indicated by way of example in FIG. 2. For instance, the washing step in the illustrated exemplary embodiment lasts from $t_0$ to $t_1$, the final-rinse step lasts from $t_2$ to $t_3$, and the optional drying step lasts from $t_4$ to $t_5$.

In the illustrated exemplary embodiment, the time period for which the washware 116 remains within the cleaning chamber 114 is detected after the end of the cleaning program, that is to say after time $t_5$ or, if no drying step is performed, after time $t_3$. This can be performed, for example, by the opening sensor 156 being used to identify whether the door 158 is open and, if this is the case, whether the door has been open in this way for longer than a prespecified threshold value. This threshold value may be an empirical value, for example a value which has been autonomously learnt by the controller 160 and/or input by a user, which is necessary at the minimum for removing the washware 116 from the cleaning chamber 114. If it is established that longer than a prespecified time period has passed since the end of the cleaning program, that is to say since time $t_3$ (if no drying step is carried out) or since time $t_5$ (if a drying step is carried out), an operator control element 162 of the dishwasher 110 is enabled by the controller 160, so that a final-rinse step carried out once again by means of this operator control element By way of example, the controller 160 can be designed to inform a user of the dishwasher 110 that the operator control element 162 is enabled in this way by way of an optical, audible or haptic signal, for example by the operator control element 162 flashing and/or changing color. Therefore, if the operator control element 162 is operated at a time $t_6$, which follows the time $t_3$ (without a drying step) or the time $t_5$ (with a drying step) by longer than a prespecified time period $\Delta t_S$, the final-rinse step K is restarted, said final-rinse step lasting until time $t_7$. By way of example, the new final-rinse step K can again be followed by a new drying step T, for example from $t_8$ to $t_9$. The time period for which the washware 116 remains in the interior of the cleaning chamber 114 without being removed can be detected again after time $t_7$ (if no new drying step is carried out) or after time $t_9$ (if a drying step is carried out once again). If this time period again exceeds a prespecified time period, the operator control element 162 can once again be enabled by means of the controller 160, so that at least the final-rinse step K can once again be carried out again, optionally followed by a further drying step again. Accordingly, the at least one additional final-rinse step, which is initiated by the operator control element 162, and optionally the additional drying step can also be carried out repeatedly.

In the illustrated exemplary embodiment according to FIG. 1, the operator control element 162 is an additional operator control element. However, the operator control element 162 can also comprise a multiple function and/or can be integrated into other elements of the dishwasher 110, wherein the function of triggering the additional final-rinse step at time $t_6$ is enabled only by the controller 160 after the time $t_5+\Delta t_S$ (if the drying step is carried out) or $t_3+\Delta t_S$ (without the drying step being carried out) is exceeded. By way of example, the operator control element 162 may be a program start switch, in particular a program button, by means of which the entire cleaning program can also be started.

As an alternative or in addition, the operator control element 162 can also be integrated, for example, into the door 158. By way of example, brief opening of the door 158 can be interpreted as operation of the operator control element 162. By way of example, a maximum time period can be prespecified for this purpose, wherein opening of the door 148 below this threshold time value is interpreted as an operating operator control element 162. The opening sensor 156 can again be used for this purpose by way of example. By way of example, an opening time of less than a threshold value of 1 second to 10 seconds, for example a threshold value of 2 seconds or 3 seconds, can be interpreted as operation of the operator control element 162 and therefore a request for a new final-rinse step.

However, as an alternative to the program cycle illustrated in FIG. 2, other program cycles can be realized within the scope of the present invention. By way of example, the final-rinse step K can be initiated only when requested by way of the operator control element 162. By way of example, the cleaning program can be executed in such a way that only the washing step S is carried out in the first instance. After the washing step S has been carried out, the operator control element 162 can then be enabled by the controller 160 for example, so that operation of the operator control element 162 by a user is interpreted as a request for the final-rinse step K and optionally the following drying step T. Refinements in which the final-rinse step K and optionally additionally the drying step T are carried out solely when requested by means of the operator control element 162 and/or again when requested by means of the operator control element 162 are also feasible. Furthermore, as explained above, embodiments in which the final-rinse step K is carried out once again when one or more conditions are met are feasible as an alternative or in addition. Carrying out the final-rinse step once again can be performed, for example, by way of operation of the operator control element 162 and/or automatically. For instance, as explained above, the residence time of the washware 116 in the cleaning chamber 114 can be compared with one or more threshold values, specifically the prespecified time period and/or a second prespecified time period for example. By way of example, the final-rinse step K can be automatically restarted when this residence time reaches or exceeds a prespecified second time period.

LIST OF REFERENCE SYMBOLS

110 Dishwasher
112 Single-chamber dishwasher
114 Cleaning chamber
116 Washware
118 Washware rack
120 Fluid apparatus
122 Washing nozzle system
124 Final-rinse nozzle system
126 Washing lines
128 Washing pump
130 Washing liquid
132 Wash tank
134 Heating apparatus
136 Outlet line
138 3-way valve
140 Outlet pump
142 Outflow
144 Final-rinse tank
146 Heating apparatus
148 Final-rinse liquid
150 Fresh-water feed line
152 Final-rinse lines
154 Final-rinse pump
156 Opening sensor
158 Door
160 Controller
162 Operator control element

The invention claimed is:

1. A dishwasher, comprising a cleaning chamber for accommodating washware, wherein the dishwasher is designed to apply at least one washing liquid and at least one final-rinse liquid to the washware in the cleaning chamber, wherein the dishwasher has a controller, wherein the controller is designed to carry out at least one cleaning program, wherein the cleaning program comprises at least one washing step, in which the washing liquid is applied to the washware, and at least one final-rinse step, in which the final-rinse liquid is applied to the washware, wherein the dishwasher has at least one operator control element which can be operated by a user, wherein the controller is designed in such a way that the final-rinse step can be carried out at least once on the basis of operation of the operator control element after at least the washing step of the cleaning program has been carried out, wherein the controller is designed to carry out the cleaning program in the first instance in full and including the washing step and the final-rinse step, and then to carry out the final-rinse step at least once again on the basis of operation of the operator control element, wherein the controller is designed to identify that the washware has remained in the cleaning chamber for longer than a prespecified time period after the cleaning program has been carried out, and to allow the final-rinse step to be carried out once again on the basis of operation of the operator control element only when this condition is identified.

2. The dishwasher according to claim 1, wherein the condition that the washware has remained in the cleaning chamber for longer than the prespecified time period after the cleaning program has been carried out is identified on the basis of opening of a door of the dishwasher being identified.

3. The dishwasher according to claim 2, wherein the controller is designed to compare a time period for the door being open with at least one threshold value and to conclude that the washware has been removed from the cleaning chamber when the threshold value is exceeded.

4. The dishwasher according to claim 1, wherein the dishwasher has at least one sensor for detecting at least one state of one or both of the washware or of the dishwasher, wherein the controller is designed to allow the final-rinse step to be carried out once again on the basis of operation of the operator control element depending on the detected state.

5. The dishwasher according to claim 1, wherein the controller is designed to enable the operator control element for operation only after the washing step has been carried out.

6. The dishwasher according to claim 1, wherein the operator control element is designed to fulfill at least a multiple function.

7. The dishwasher according to claim 6, wherein the controller is designed to enable the function of the operator control element, in which function the final-rinse step is carried out on the basis of operation of the operator control element after at least the washing step of the cleaning program has been carried out, only when at least one condition of the dishwasher is met.

8. The dishwasher according to claim 1, wherein the dishwasher is designed to transmit at least one signal to the user, said signal indicating that the final-rinse step can be carried out on the basis of operation of the operator control element.

9. The dishwasher according to claim 1, wherein the controller is designed to selectively carry out a plurality of cleaning programs, wherein at least two of the cleaning programs each comprise the at least one washing step and the at least one final-rinse step, wherein the controller is designed in such a way that the final-rinse step of at least a first of the cleaning programs can be carried out at least once on the basis of operation of the operator control element after the washing step has been carried out, and wherein the controller is further designed in such a way that the final-rinse step of at least a second of the cleaning programs can be carried out independently of operation of the operator control element after the washing step has been carried out.

10. The dishwasher according to claim 1, wherein the cleaning program further comprises at least one drying step, wherein the controller is designed to carry out the drying step after the final-rinse step has been carried out.

11. The dishwasher according to claim 1, wherein the controller is designed to carry out the cleaning program in the first instance in full and including the washing step and the final-rinse step, wherein the controller is further designed to identify that the washware has remained in the cleaning chamber for longer than a prespecified second time period after the cleaning program has been carried out, and to automatically start a new final-rinse step when this condition is identified.

12. A method for cleaning washware, comprising applying at least one washing liquid and at least one final-rinse liquid to the washware in a cleaning chamber, wherein at least one cleaning program is carried out, wherein the cleaning program comprises at least one washing step, in which the washing liquid is applied to the washware, and at least one final-rinse step, in which the final-rinse liquid is applied to the washware, wherein the method further comprises use of at least one operator control element which can be operated by a user, wherein the final-rinse step can be carried out at least once on the basis of operation of the operator control element after at least the washing step of the cleaning program has been carried out, wherein the dishwasher according to claim 1 is used in the method, wherein in the first instance the cleaning program is carried out in full and including the washing step and the final-rinse step, and wherein the final-rinse step can then be carried out once again on the basis of operation of the operator control element, wherein it is identified whether the washware has remained in the cleaning chamber for longer than a prespecified time period after the cleaning program has been carried out, and operation of the operator control element to carry out the final-rinse step once again is allowed only when this condition is identified.

* * * * *